United States Patent
Ano et al.

(10) Patent No.: US 11,415,291 B2
(45) Date of Patent: Aug. 16, 2022

(54) LIGHT-EMITTING DEVICE WITH FIRST AND SECOND FIXTURES CONFIGURED TO IMPART CURVATURE TO A FLEXIBLE SURFACE LIGHT SOURCE AND METHOD OF MANUFACTURING THEREOF

(71) Applicant: STANLEY ELECTRIC CO., LTD., Tokyo (JP)

(72) Inventors: Koichiro Ano, Tokyo (JP); Hiroyuki Chikama, Tokyo (JP); Kazuho Nakajima, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/936,163

(22) Filed: Jul. 22, 2020

(65) Prior Publication Data
US 2021/0025564 A1     Jan. 28, 2021

(30) Foreign Application Priority Data
Jul. 24, 2019    (JP) .............................. JP2019-136120

(51) Int. Cl.
*G02F 1/1333*    (2006.01)
*F21S 43/145*    (2018.01)
*F21S 43/19*     (2018.01)

(52) U.S. Cl.
CPC ............. *F21S 43/145* (2018.01); *F21S 43/19* (2018.01); *G02F 1/133305* (2013.01); *G02F 1/133308* (2013.01)

(58) Field of Classification Search
CPC .......... H01L 2251/5338; H01L 51/0097; F21S 43/145; F21S 41/155; G02F 1/133305; G02F 1/133314; G02F 1/133317; G02F 1/13332; G02F 1/133322; F21V 19/002;
(Continued)

(56) References Cited

U.S. PATENT DOCUMENTS

2006/0273304 A1* 12/2006 Cok ................. H01L 51/524
                                                    438/26
2009/0015747 A1*  1/2009 Nishizawa ........ G02F 1/133308
                                                    349/58
(Continued)

FOREIGN PATENT DOCUMENTS

JP         2017-220309 A    12/2017

*Primary Examiner* — Rajarshi Chakraborty
*Assistant Examiner* — Steven Y Horikoshi
(74) *Attorney, Agent, or Firm* — Kenealy Vaidya LLP

(57) ABSTRACT

Provided are a light-emitting device and a method of manufacturing the same. The light-emitting device includes a flexible surface light source curved in a desired shape, a first fixture that includes first and second positioning ribs, and has a first curved surface between the first and second positioning ribs, and a second fixture having a second curved surface. The method includes mounting the surface light source in a flat state on the first positioning rib and the second positioning rib such that the front or rear surface and the first curved surface face to each other across a space, bringing the second fixture close to the first fixture and pushing the surface light source toward the first fixture to curve the surface light source, and fixing the first and second fixtures together with the curved surface light source held therebetween.

7 Claims, 15 Drawing Sheets

(58) Field of Classification Search
CPC ... F21V 19/003; F21V 19/0035; F21V 19/004
See application file for complete search history.

(56) References Cited

U.S. PATENT DOCUMENTS

| | | | | |
|---|---|---|---|---|
| 2009/0316062 | A1* | 12/2009 | Nishizawa | G02F 1/133305 349/58 |
| 2011/0018025 | A1* | 1/2011 | Bertram | H01L 51/52 257/E51.018 |
| 2013/0161684 | A1* | 6/2013 | Momma | H01L 51/5203 257/100 |
| 2013/0164437 | A1* | 6/2013 | Yamazaki | H05B 33/10 427/66 |
| 2013/0314638 | A1* | 11/2013 | Ahn | G02F 1/133308 349/58 |
| 2016/0088745 | A1* | 3/2016 | Lee | H01J 17/49 361/749 |

* cited by examiner

LIGHT-EMITTING DEVICE WITH FIRST AND SECOND FIXTURES CONFIGURED TO IMPART CURVATURE TO A FLEXIBLE SURFACE LIGHT SOURCE AND METHOD OF MANUFACTURING THEREOF

This application claims the priority benefit under 35 U.S.C. § 119 of Japanese Patent Application No. 2019-136120 filed on Jul. 24, 2019, which is hereby incorporated in its entirety by reference.

TECHNICAL FIELD

The presently disclosed subject matter relates to a method of manufacturing a light-emitting device and a light-emitting device, and more particularly, to a method of manufacturing a light-emitting device and a light-emitting device capable of reducing a work load of a worker when a flexible surface light source is fixed while maintaining its desired curved shape.

BACKGROUND ART

Conventionally, there has been proposed a light-emitting device using a surface light source, e.g., an organic EL panel, which includes a front surface with a light-emitting surface and a rear surface on the side opposite to the front surface and has flexibility. Examples thereof may include those disclosed in Japanese Patent Application Laid-Open No. 2017-220309.

However, in the light-emitting device described in Japanese Patent Application Laid-Open No. 2017-220309, when fixing the surface light source in a curved state, it is required for the worker to, while maintaining a state of curving the surface light source to a desired shape, position a pair of tabs, provided on respective end portions of the surface light source, with respect to a pair of slits formed in a support member and then carefully insert the tabs into the respective slits. Thus, there is a problem that the work load of the worker is large.

SUMMARY

The presently disclosed subject matter was devised in view of these and other problems and features in association with the conventional art. According to an aspect of the presently disclosed subject matter, there can be provided a method of manufacturing a light-emitting device and a light-emitting device capable of reducing a work load of a worker when a surface light source is fixed while its desired curved shape is maintained.

In order to achieve the foregoing object, one aspect of the presently disclosed subject matter is a light-emitting device including: a surface light source including a front surface with a light-emitting surface and a rear surface on the side opposite to the front surface and having flexibility; a first fixture including a first positioning rib and a second positioning rib, and having a first curved surface disposed between the first positioning rib and the second positioning rib; a second fixture having a second curved surface; and a fixing unit configured to fix the first fixture and the second fixture. In the light-emitting device, the first positioning rib and the second positioning rib each include a surface light source mounting portion on which the surface light source is mounted in a state in which the front surface or the rear surface faces to the first curved surface of the first fixture with a space interposed therebetween. The fixing unit is configured to fix the first fixture and the second fixture in a state in which the surface light source curved by being held between the first curved surface of the first fixture and the second curved surface of the second fixture is held therebetween.

According to this aspect, it is possible to provide a light-emitting device capable of reducing a work load of a worker when a surface light source is fixed while its desired curved shape is maintained.

In a preferable aspect of the presently disclosed subject matter, the first positioning rib and the second positioning rib may each include a regulating portion provided on the inner side with respect to the surface light source mounting portion in a curve direction corresponding to one of the first and second curved surfaces, and configured to engage with an end face of the surface light source curved by being held between the first curved surface of the first fixture and the second curved surface of the second fixture.

In a preferable aspect of the presently disclosed subject matter, the second fixture may include a positional deviation prevention rib to which the end face of the surface light source faces.

In a preferable aspect of the presently disclosed subject matter, the first curved surface and the second curved surface may each be a curved surface curved in a certain direction.

In a preferable aspect of the presently disclosed subject matter, the first curved surface is curved in an arc shape recessed in a light irradiation direction and the second curved surface is curved in an arc shape protruding in the light irradiation direction.

In a preferable aspect of the presently disclosed subject matter, the first curved surface is curved in an arc shape protruding in the light irradiation direction and the second curved surface is curved in an arc shape recessed in the light irradiation direction.

In a preferable aspect of the presently disclosed subject matter, the first curved surface and the second curved surface may each be curved in an S-shape.

In a preferable aspect of the presently disclosed subject matter, the first curved surface and the second curved surface may each be a three-dimensionally curved surface.

In a preferable aspect of the presently disclosed subject matter, the surface light source may be a flexible light source including at least one selected from the group consisting of an organic EL panel having flexibility, a liquid crystal display having flexibility, and a film light source including a plurality of semiconductor light-emitting elements fixed in a state of being two-dimensionally arranged in a flexible film.

Another aspect of the presently disclosed subject matter is a method of manufacturing a light-emitting device, which includes a surface light source curved in a desired shape, using the surface light source that includes a front surface with a light-emitting surface and a rear surface on a side opposite to the front surface and has a flexibility, a first fixture that includes a first positioning rib and a second positioning rib, and has a first curved surface disposed between the first positioning rib and the second positioning rib, and a second fixture having a second curved surface. The method includes a mounting step of mounting the surface light source in a state of a flat plate on the first positioning rib and the second positioning rib in such a manner that any of the front surface and the rear surface and the first curved surface face to each other across a space, a curving step of bringing the second fixture relatively close to the first fixture and pushing the surface light source mounted on the positioning rib toward the first fixture by the second fixture to curve the surface light source mounted on the positioning rib, and a fixing step of fixing the first fixture and the second fixture together in a state of holding therebetween the surface light source having been curved in the curving step.

According to this aspect, it is possible to provide a method of manufacturing a light-emitting device capable of reducing a work load of a worker when a surface light source is fixed while its desired curved shape is maintained.

This can be achieved by performing the mounting step of mounting the surface light source in the state of the flat plate, the curving step of bringing the second fixture relatively close to the first fixture and pushing the surface light source mounted in the mounting step toward the first fixture by the second fixture to curve the surface light source, and the fixing step of fixing the first fixture and the second fixture in a state of holding therebetween the surface light source having been curved in the curving step, to produce a light-emitting device.

In a preferable aspect of the presently disclosed subject matter, the second fixture may include a positional deviation prevention rib to which an end face of the surface light source faces in the curving step.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
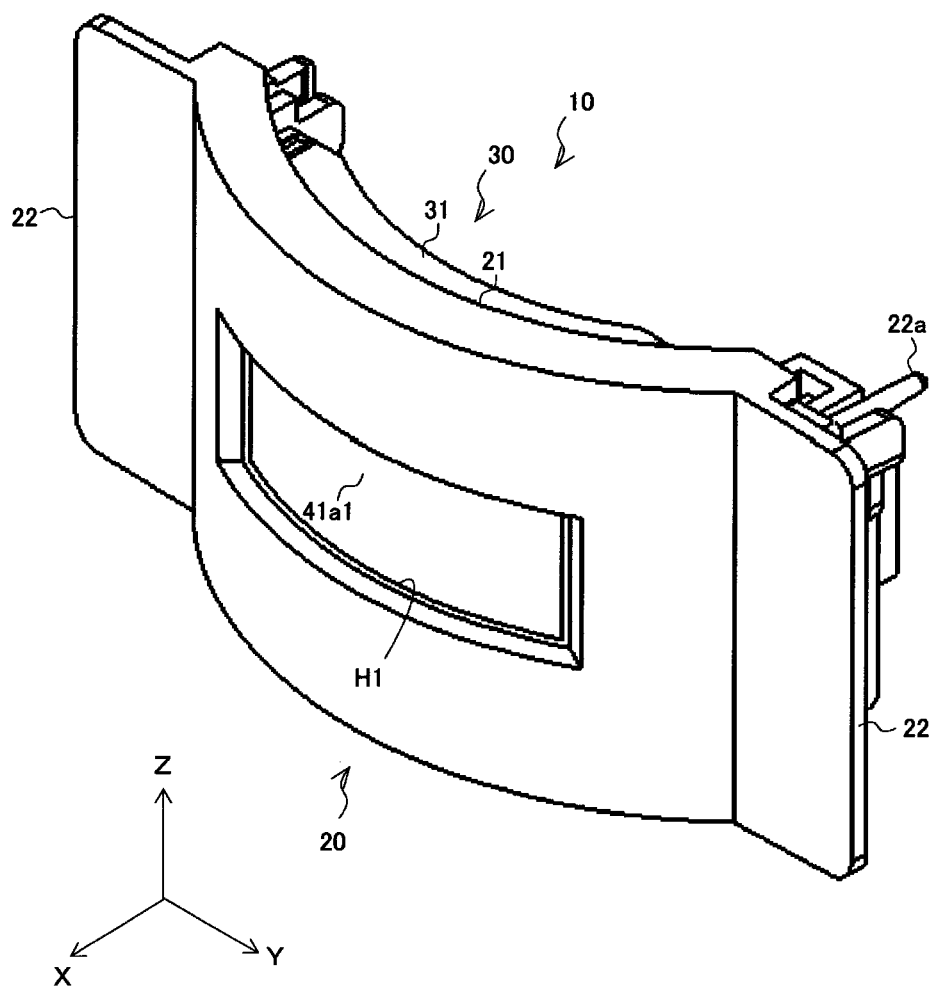
FIG. 1 is a perspective view of a vehicle lamp unit 10.

A description will now be made below to a light-emitting device of the presently disclosed subject matter with reference to the accompanying drawings in accordance with exemplary embodiments. Components corresponding to each other in the respective drawings are denoted by the same reference numerals, and a repetitive description thereof will be omitted. Hereinafter, an example of applying the light-emitting device to a vehicle lamp unit 10 will be given.

Figure 2A:
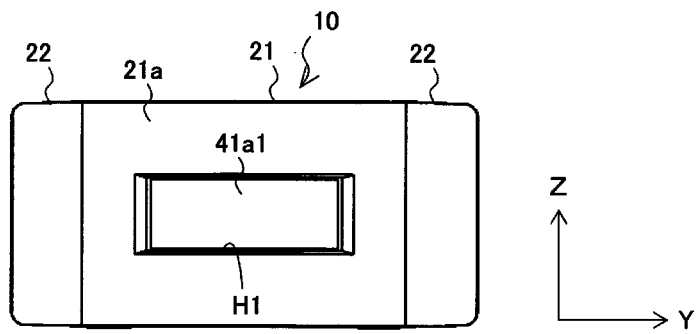
FIG. 2A is a front view of the vehicle lamp unit 10.
Figure 2B:
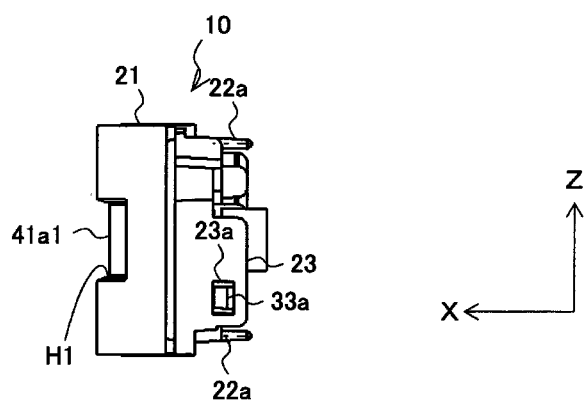
FIG. 2B is a side view thereof.
Figure 2C:
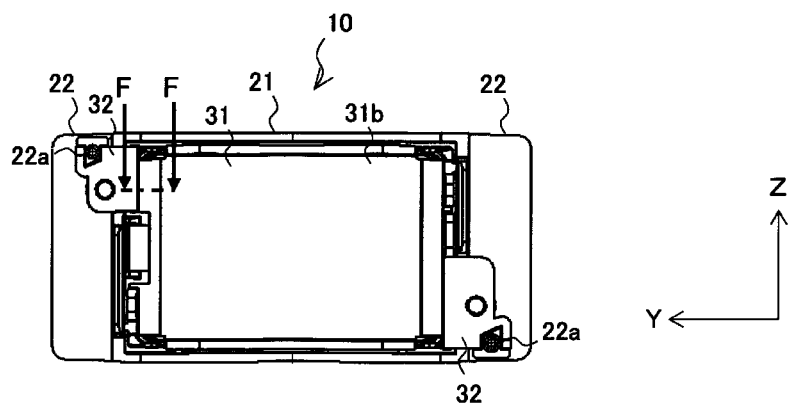
FIG. 2C is a rear view thereof.
Figure 3:
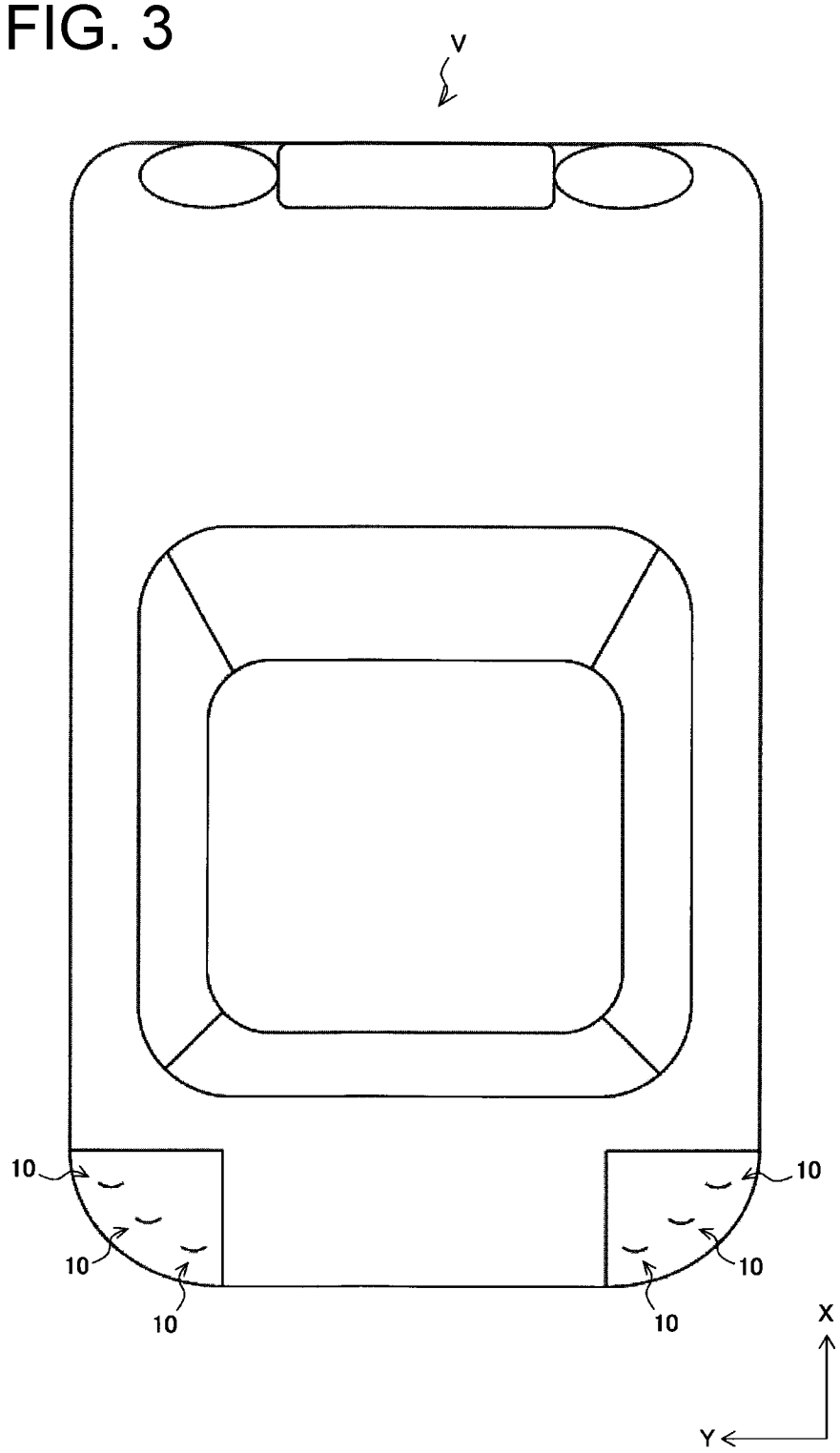
FIG. 3 is a top view of a vehicle V on which the vehicle lamp unit 10 is mounted.

FIG. 1 is a perspective view of the vehicle lamp unit 10, FIG. 2A is a front view thereof, FIG. 2B is a side view thereof, FIG. 2C is a rear view thereof. FIG. 3 is a top view of a vehicle V on which the vehicle lamp unit 10 is mounted.

The vehicle lamp unit 10 illustrated in FIGS. 1 and 2A to 2C can function as a tail lamp, for example. The vehicle lamp unit 10 may be mounted on both left and right sides of the rear end portion of the vehicle V such as an automobile, as illustrated in FIG. 3. A plurality of vehicle lamp units 10 may be mounted on both the left and right sides, and only a single vehicle lamp unit 10 may be mounted on the vehicle V as necessary. The vehicle lamp unit 10 may be disposed in a lamp chamber constituted by an outer lens and a housing, and attached to the housing or the like. Hereinafter, for convenience of description, XYZ axes will be defined. The X-axis extends in the front-to-rear direction of the vehicle, the Y-axis extends in the vehicle width direction, and the Z-axis extends in the vertical direction.

Figure 4:
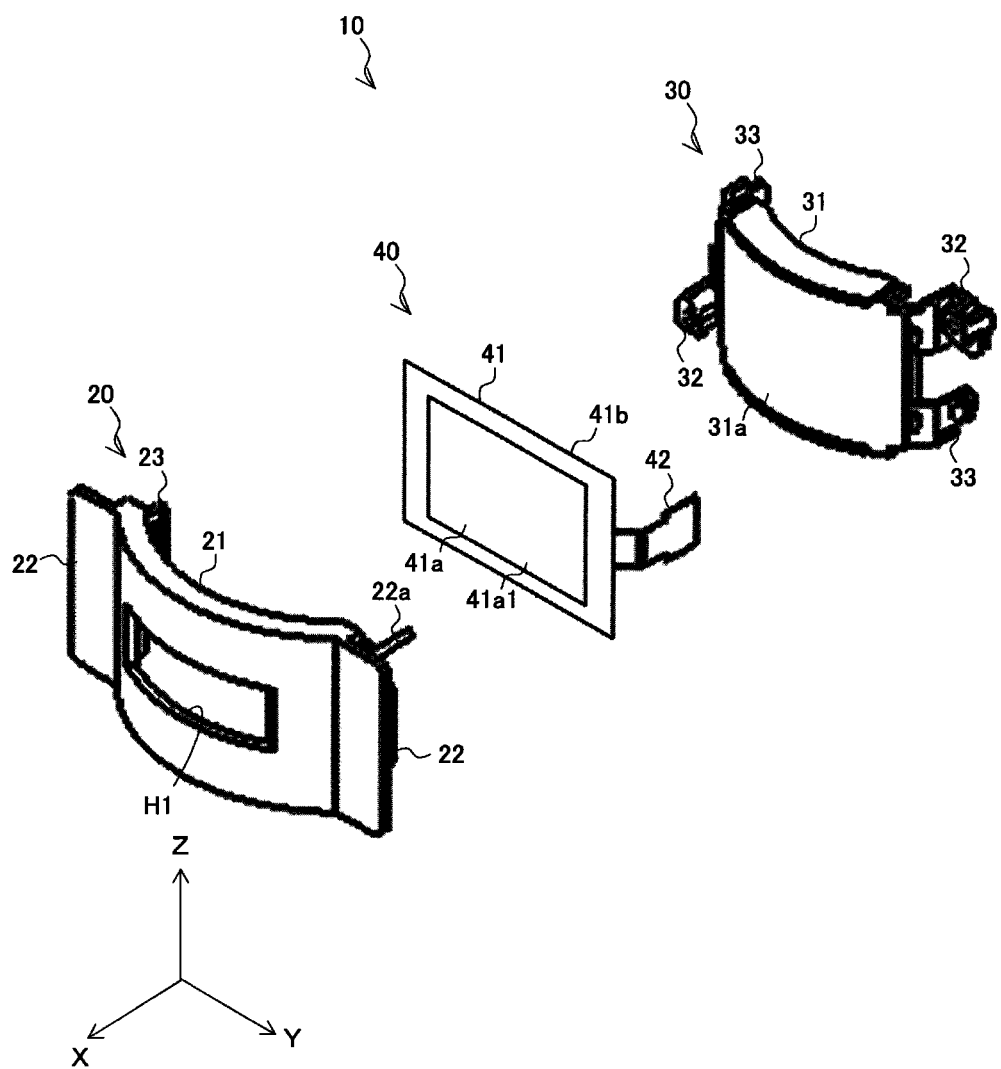
FIG. 4 is an exploded perspective view of the vehicle lamp unit 10.

FIG. 4 is an exploded perspective view of the vehicle lamp unit 10.

As illustrated in FIG. 4, the vehicle lamp unit 10 of the present exemplary embodiment includes a first fixture 20, a second fixture 30 to be fixed to the first fixture 20, and a surface light source 40 to be held between the first fixture 20 and the second fixture 30 while maintaining a state of being curved.

First, a description will be given of the surface light source 40.

The surface light source 40 includes a front surface 41a including a light-emitting surface 41a1 configured to emit, for example, red light and a rear surface 41b on the side opposite to the front surface 41a. The surface light source 40 can further include a surface light source body 41 having flexibility, and a wiring unit 42 configured to supply power for the light-emitting surface 41a1 to emit light. The surface light source 40 may be an organic EL panel, for example. The outer shapes of the surface light source body 41 and the light-emitting surface 41a1 illustrated are rectangular, for example. The outer shapes of the surface light source body 41 and the light-emitting surface 41a1 are not limited to a rectangular shape, and may have a circular shape or other shapes.

Next, the first fixture 20 will be described.

Figure 5A:
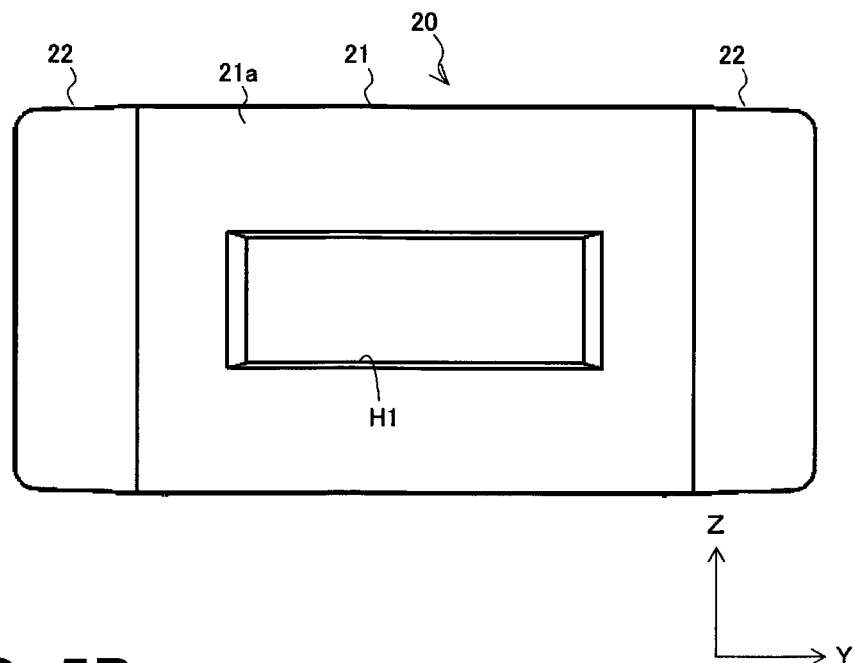
FIG. 5A is a front view of a first fixture 20.
Figure 5B:
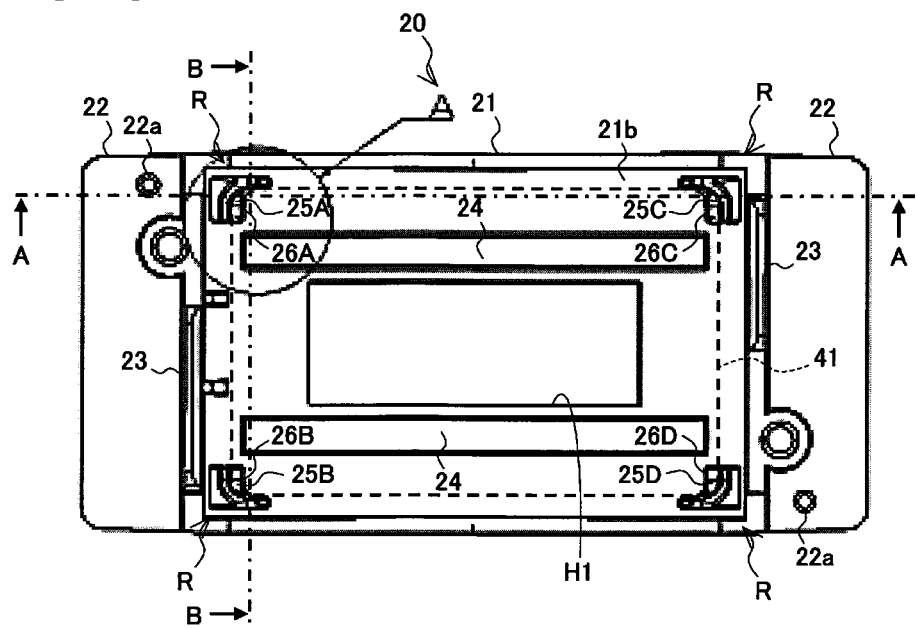
FIG. 5B is a rear view thereof.
Figure 6:
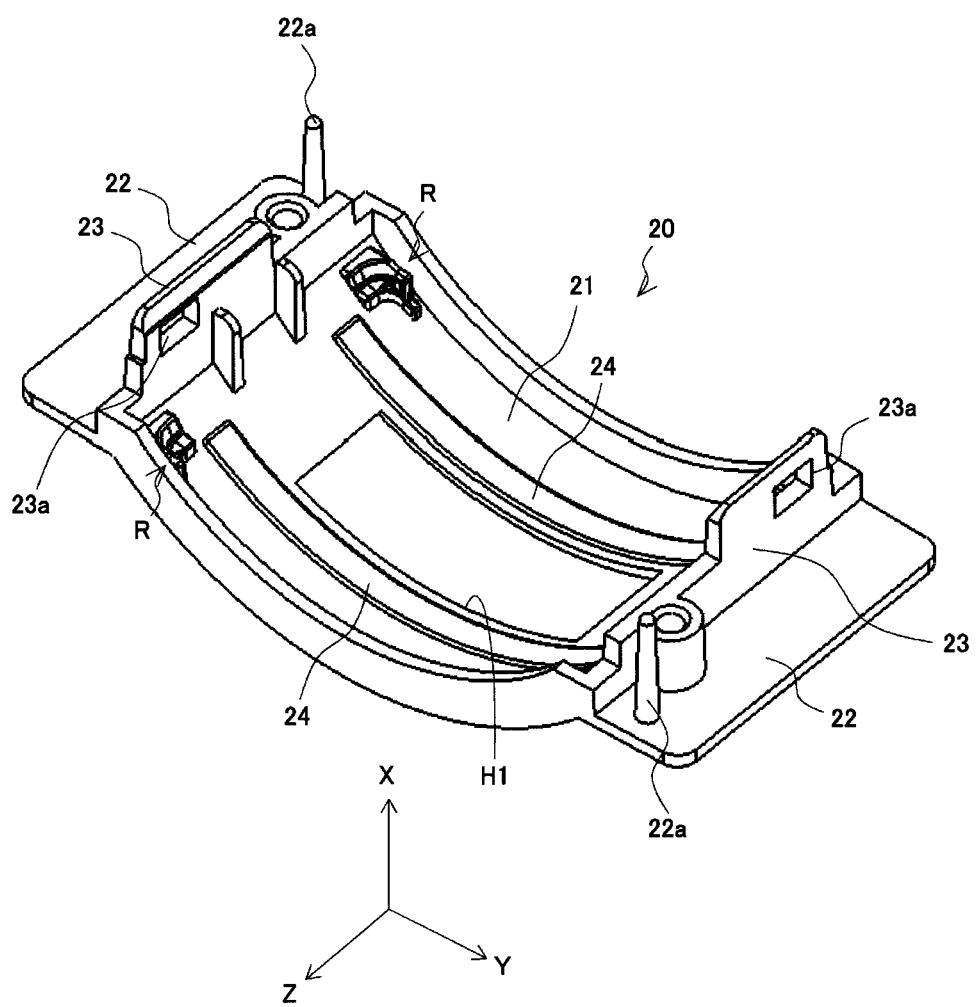
FIG. 6 is a perspective view of the first fixture 20 as viewed from the rear side.

FIG. 5A is a front view of the first fixture 20 and FIG. 5B is a rear view thereof. FIG. 6 is a perspective view of the first fixture 20 as viewed from the rear side.

As illustrated in FIGS. 4 to 6, the first fixture 20 includes a first fixture body 21, a first extension portion 22 extending outward in the Y-axis direction from each of the end portions of the first fixture body 21 in the Y-axis direction, and a second extension portion 23 extending in a direction (X-axis direction) opposite to the light irradiation direction from each of the end portions of the first fixture body 21 in the Y-axis direction. Examples of the material of the first fixture 20 may include an acrylic resin, a polycarbonate resin, and the like synthetic resins. The resin may be an opaque resin such as a black-colored resin or a transparent resin.

Figure 7A:
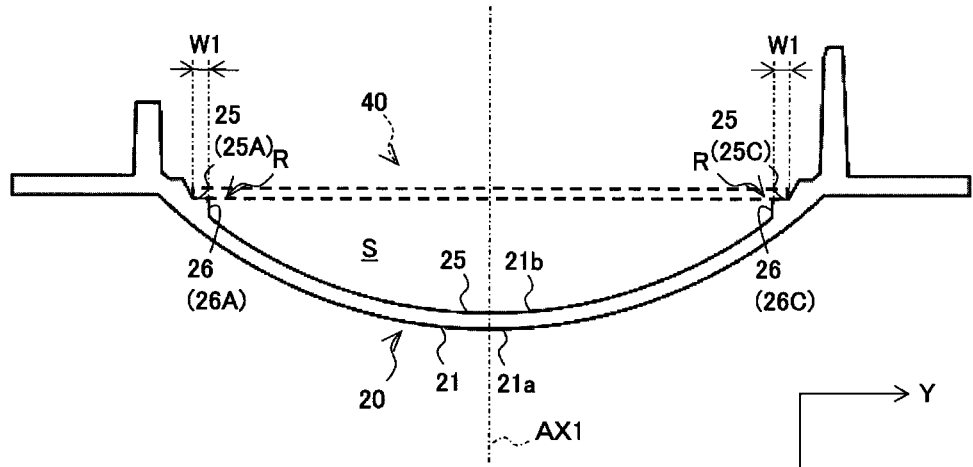
FIG. 7A is a cross-sectional view taken along line A-A of FIG. 5B.
Figure 8A:
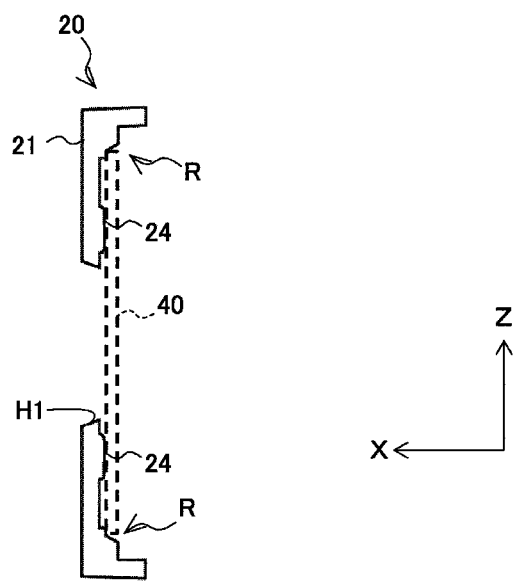
FIG. 8A is a cross-sectional view taken along line B-B of FIG. 5B.

FIG. 7A is a cross-sectional view taken along line A-A of FIG. 5B. FIG. 8A is a cross-sectional view taken along line B-B of FIG. 5B. A dashed-dotted line indicated by reference numeral AX1 in FIG. 7A passes through the center of the first fixture body 21 with respect to the Y-axis direction, and extends in the X-axis direction. Hereinafter, the dashed-dotted line is referred to as the reference axis AX1.

As illustrated in FIG. 7A, the rear surface 21b of the first fixture body 21 is curved in a certain direction. Specifically, the first fixture body 21 is configured to protrude in the light irradiation direction (lower direction in FIG. 7A) so that the rear surface 21b of the first fixture body 21 is recessed in the light irradiation direction, and is curved in an arc shape symmetrical with respect to the vertical plane (plane parallel to the XZ plane) including the reference axis AX1. The rear surface 21b of the first fixture body 21 is an example of the first curved surface of the presently disclosed subject matter. The front surface 21a of the first fixture body 21 is curved in a similar manner.

The first fixture body 21 includes a through hole H1 through which the light-emitting surface 41a1 of the surface light source 40 is exposed (see FIGS. 5A and 5B, etc.). The through hole H1 penetrates the first fixture body 21 from the front surface 21a to the rear surface 21b thereof. An opaque resin when adopted as the material of the first fixture 20 can conceal a portion of the surface light source 40 other than the light-emitting surface 41a1 thereof exposed from the through hole H1 of the first fixture 20, for example, can conceal the wiring portion 42 of the surface light source 40.

The rear surface 21b of the first fixture body 21 includes a surface light source holding portion 24 configured to press the front surface 41a of the surface light source 40 (surface light source body 41) (see FIG. 5B, FIG. 8A, etc.). The surface light source holding portion 24 is configured to slightly protrude from the rear surface 21b of the first fixture body 21. The surface light source holding portion 24 is provided on the rear surface 21b of the first fixture body 21 both above and below the through hole H1.

As illustrated in FIG. 5B, the first fixture body 21 includes surface light source mounting portions 25A to 25D and first regulating portions 26A to 26D disposed at positions on the rear surface 21b corresponding to the four corners of the surface light source 40 (the surface light source body 41).

The surface light source mounting portions 25A to 25D have the same configuration, and the first regulating portions 26A to 26D have the same configuration. Hereinafter, the surface light source mounting portions 25A to 25D and the first regulating portions 26A to 26D are collectively referred to as a surface light source mounting portion(s) 25 and a first regulating portion(s) 26, respectively, when not distinguished in particular. The surface light source mounting portions 25 and the first regulating portions 26 constitute positioning ribs R (four in total in this exemplary embodiment). The two positioning ribs R on the left side in FIG. 5B are an example of the first positioning rib of the presently disclosed subject matter, and the two positioning ribs R on the right side in FIG. 5B are an example of the second positioning rib of the presently disclosed subject matter.

As illustrated in FIG. 7A, the surface light source mounting portions 25 each have a surface, for example, in parallel to the YZ plane, and are arranged on the same plane. The surface light source mounting portions 25A and 25C are arranged at respective positions symmetrical with respect to the vertical plane including the reference axis AX1 therebetween (see FIG. 7A). The surface light source mounting portions 25B and 25D are similarly arranged at positions symmetrical with respect to the vertical plane including the reference axis AX1 therebetween.

The first regulating portions 26 each have a surface, for example, in parallel to the XZ plane, and are provided on the inner side in the Y-axis direction (curve direction) with respect to the surface light source mounting portions 25. The first regulating portions 26 are configured to engage with the end face of the surface light source 40 in the Y-axis direction with the surface light source 40 held in a state of being curved between the first fixture 20 and the second fixture 30. Thus, the Y-axis direction movement of the surface light source 40 held in a state of being curved between the first fixture 20 and the second fixture 30 is restricted. The first regulating portion 26 is an example of the regulating portion of the presently disclosed subject matter.

Figure 7B:
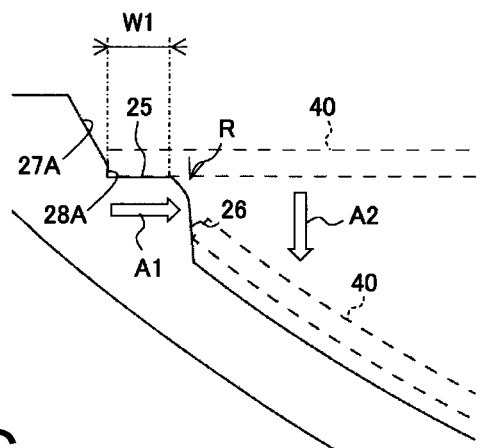
FIG. 7B is an enlarged view illustrating a periphery of a left positioning rib R in FIG. 7A.
Figure 7C:
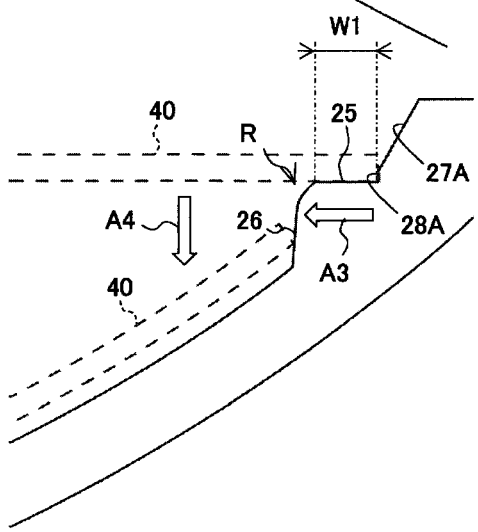
FIG. 7C is an enlarged view illustrating a periphery of a right positioning rib R in FIG. 7A.

FIG. 7B is an enlarged view illustrating the periphery of the left positioning rib R in FIG. 7A, and FIG. 7C is an enlarged view illustrating the periphery of the right positioning rib R in FIG. 7A.

As illustrated in FIGS. 7B and 7C, a first guide surface 27A is provided on the outside in the Y-axis direction with respect to the surface light source mounting portion 25 on the rear surface 21b of the first fixture body 21. The first guide surface 27A is, for example, an inclined surface which is inclined toward the surface light source mounting portion 25. The surface light source 40 in contact with the first guide surface 27A can move while being guided in the Y-axis direction toward the surface light source mounting portion 25 along the first guide surface 27A to be mounted on the surface light source mounting portion 25.

Figure 8B:
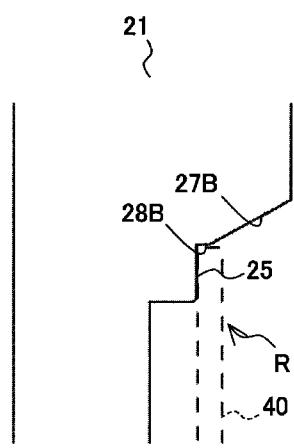
FIG. 8B is an enlarged view illustrating a periphery of a positioning rib R in FIG. 8A.

FIG. 8B is an enlarged view illustrating the periphery of the positioning rib R in FIG. 8A.

As illustrated in FIG. 8B, a second guide surface 27B is provided on the outside in the Z-axis direction with respect to the surface light source mounting portion 25 of the rear surface 21b of the first fixture body 21. The second guide surface 27B is, for example, an inclined surface which is inclined toward the surface light source mounting portion 25. The surface light source 40 in contact with the second guide surface 27B can move while being guided in the Z-axis direction toward the surface light source mounting portion 25 along the second guide surface 27B to be mounted on the surface light source mounting portion 25.

As illustrated in FIGS. 7B and 7C, a second regulating portion 28A is provided between the surface light source mounting portion 25 and the first guide surface 27A. The second regulating portion 28A is, for example, a plane parallel to the XZ plane. The end face of the surface light source 40 mounted on the surface light source mounting portion 25 in the Y-axis direction faces the second regulating portion 28A across a slight gap. Thus, the movement in the Y-axis direction of the surface light source 40 mounted on the surface light source mounting portion 25 is restricted.

As illustrated in FIG. 8B, a third regulating portion 28B is provided between the surface light source mounting portion 25 and the second guide surface 27B. The third regulating portion 28B has, for example, a surface parallel to the XY plane. The end face in the Z-axis direction of the surface light source 40 mounted on the surface light source mounting portion 25 faces the third regulating portion 28B across a slight gap. Thus, the movement in the Z-axis direction of the surface light source 40 mounted on the surface light source mounting portion 25 is restricted.

As illustrated in FIG. 6 or the like, the end portions of the first fixture body 21 in the Y-axis direction extend outward in the Y-axis direction (+Y direction and −Y direction) to constitute first extension portions 22, respectively. The rear surface of the first extension 22 is provided with a positioning pin 22a which is inserted into, e.g., fitted into, the positioning hole H2 of the second fixture 30 in order to position the second fixture 30 on the first fixture 20.

Further, the end portions of the first fixture body 21 in the Y-axis direction extend in the direction opposite to the light irradiation direction (X-axis direction) to constitute second extension portions 23, respectively. The second extension portion 23 is provided with an engaging portion 23a, or a through hole, to be engaged with a claw portion 33a of the second fixture 30 in order to fix the second fixture 30 to the first fixture 20. The set of the engaging portion 23a of the first fixture 20 and the claw portion 33a of the second fixture 30 is an example of the fixing unit of the presently disclosed subject matter.

Next, the second fixture 30 will be described.

Figure 9A:
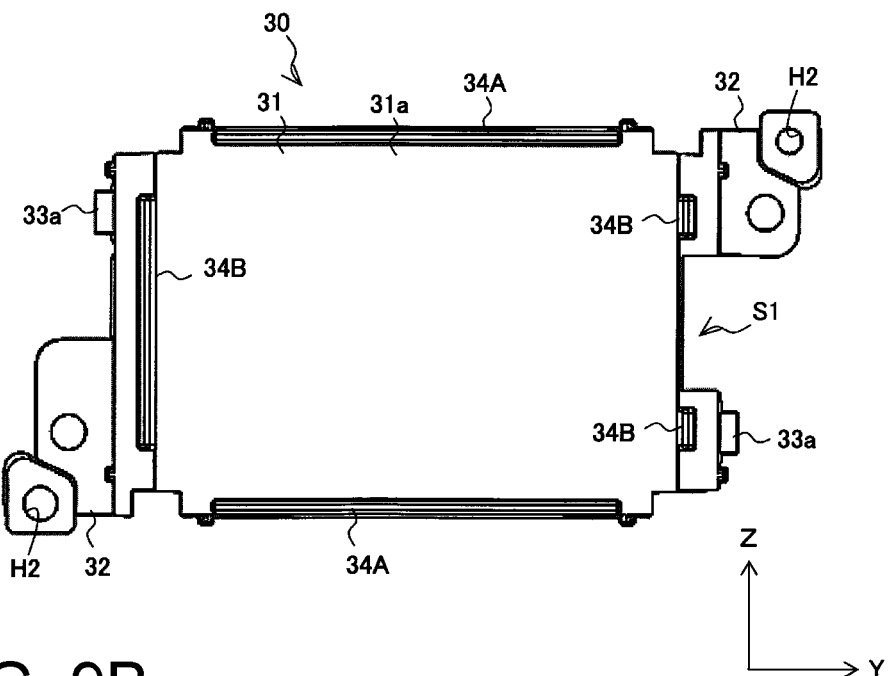
FIG. 9A is a front view of a second fixture 30.
Figure 9B:
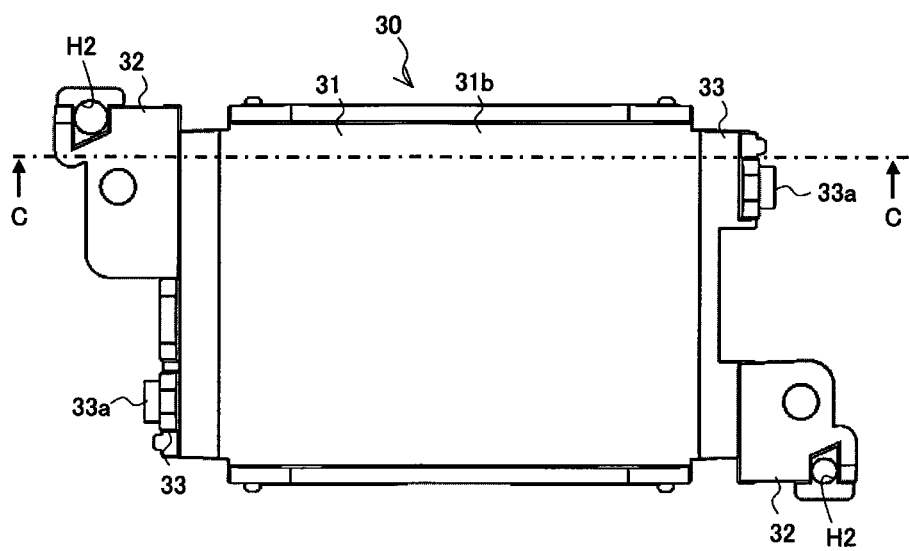
FIG. 9B is a rear view thereof.
Figure 10:
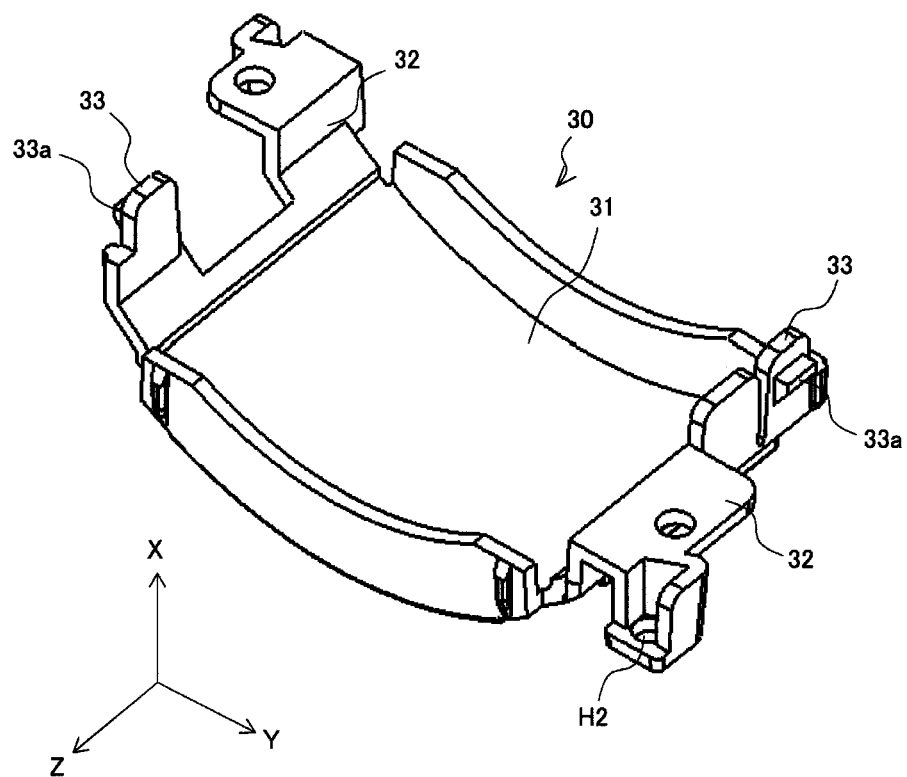
FIG. 10 is a perspective view of the second fixture 30 as viewed from the rear side.

FIG. 9A is a front view of the second fixture 30, and FIG. 9B is a rear view thereof. FIG. 10 is a perspective view of the second fixture 30 as viewed from the rear side.

As illustrated in FIG. 9A, FIG. 9B, and FIG. 10, the second fixture 30 includes a second fixture main body 31, a third extension portion 32 extending in the light irradiation direction (X-axis direction) from each of the end portions of the second fixture main body 31 in the Y-axis direction, and a fourth extension portion 33 extending from each of the end portions of the second fixture main body 31 in the Y-axis direction in the light irradiation direction (X-axis direction). The third extension portions 32 are arranged at diagonal positions of the end portions in the Y-axis direction of the second fixture body 31. Similarly, the fourth extension portions 33 are arranged at diagonal positions of the end portions in the Y-axis direction of the second fixture body 31. Examples of the material of the second fixture 30 may include an acrylic resin, a polycarbonate resin, and the like synthetic resins. The resin may be an opaque resin or a transparent resin.

Figure 11:
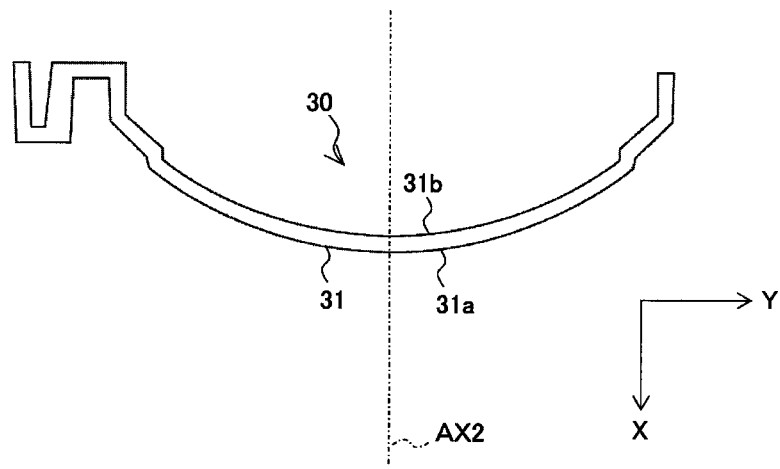
FIG. 11 is a cross-sectional view taken along line C-C of FIG. 9B.

FIG. 11 is a cross-sectional view taken along line C-C of FIG. 9B. A dashed-dotted line indicated by reference numeral AX2 in FIG. 11 passes through the center of the second fixture body 31 with respect to the Y-axis direction, and extends in the X-axis direction. Hereinafter, the dashed-dotted line is referred to as the reference axis AX2.

As illustrated in FIG. 11, the front surface 31a of the second fixture body 31 is curved to have a shape which is one obtained by inverting the rear surface 21b of the first fixture body 21, and thus, similarly to the rear surface 21b of the first fixture body 21, is curved in the same certain direction. Specifically, the front surface 31a of the second fixture body 31 is configured to protrude in the light irradiation direction (lower direction in FIG. 11), and is curved in an arc shape symmetrical with respect to the vertical plane (plane parallel to the XZ plane) including the reference axis AX2. The front surface 31a of the second fixture body 31 is an example of the second curved surface of the presently disclosed subject matter. The rear surface 31b of the second fixture body 31 is curved in a similar manner.

As illustrated in FIG. 9A, the front surface 31a of the second fixture body 31 includes first positional deviation preventing ribs 34A provided at respective both ends in the Z-axis direction of the front surface 31a of the second fixture body 31, and second positional deviation preventing ribs 34B provided at respective both ends in the Y-axis direction. Incidentally, in FIG. 9A, the right two second positional deviation preventing ribs 34B are provided vertically away from each other across the space S1 where the wiring portion 42 of the surface light source 40 is disposed.

Figure 13A:
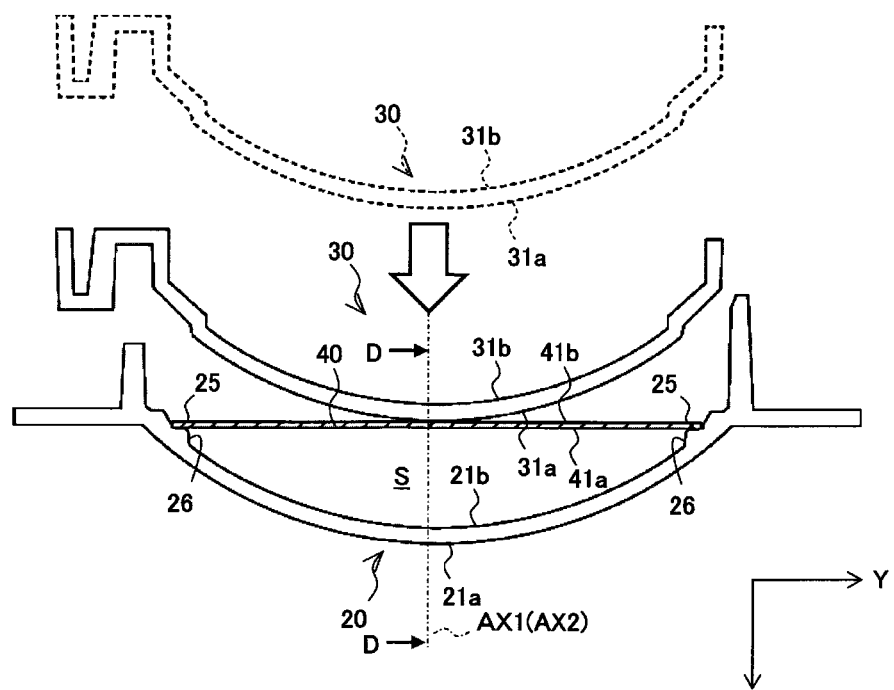
FIG. 13A is a diagram for describing a curving step.
Figure 13B:
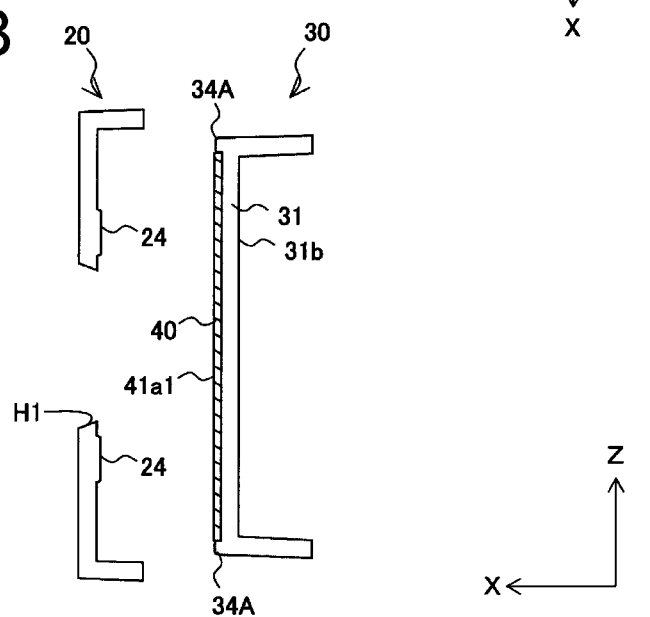
FIG. 13B is a cross-sectional view taken along line D-D of FIG. 13A.

As illustrated in FIG. 13B, in the course of the curving (see FIGS. 13A to 15B), the end faces of the surface light source 40 in the Z-axis direction face the respective first positional deviation preventing ribs 34A across a slight gap. That is, in the course of the curving, while the end faces of the surface light source 40 in the Z-axis direction and the first positional deviation preventing ribs 34A maintain a state of being opposed across a slight gap, the surface light source 40 is curved between the first fixture 20 and the second fixture 30. Thus, in the course of the curving, the positional deviation of the surface light source 40 (mainly, positional deviation in the Z-axis direction) is suppressed.

As illustrated in FIG. 10, the end portions in the Y-axis direction of the second fixture body 31 extend in the light irradiation direction (X-axis direction) to constitute the third extension portions 32, respectively. The third extension 32 is provided with a positioning hole H2 into which the corresponding positioning pin 22a of the first fixture 20 is inserted in order to position the second fixture 30 on the first fixture 20.

Further, the end portions of the second fixture body 31 in the Y-axis direction extend in the light irradiation direction (X-axis direction) to constitute the fourth extension portions 33 (hook portions), respectively. The fourth extension portion 33 is provided with the claw portion 33a to be engaged with the engaging portion 23a of the first fixture 20 (through hole) in order to fix the second fixture 30 to the first fixture 20.

Next, an example of a method of manufacturing the vehicle lamp unit 10 will be described.

The vehicle lamp unit 10 can be manufactured through the following steps (1) to (3).

(1) Mounting step: mounting the surface light source 40 in the state of a flat plate on the first fixture 20 (on the surface light source mounting portions 25).

Figure 12:
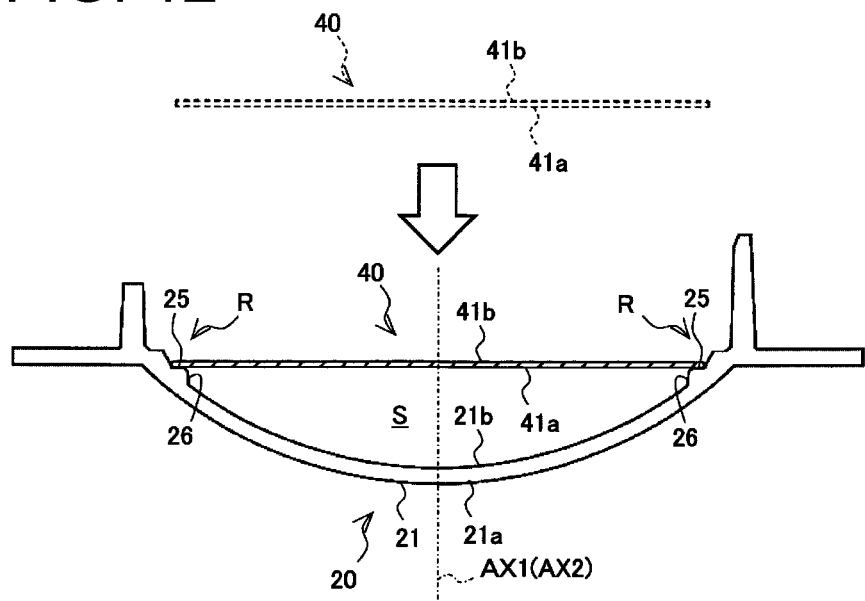
FIG. 12 is a diagram for describing a mounting step.

FIG. 12 is a diagram illustrating the mounting step.

As illustrated in FIG. 12, the mounting step is to mount the surface light source 40 in the state of the flat plate on the surface light source mounting portions 25 (positioning ribs R) of the first fixture 20 in such a manner that the rear surface 21b of the first fixture body 21 and the front surface 41a of the surface light source 40 are opposed to each other across a space S.

The surface light source 40 in the state of the flat plate is moved while being guided along the first guide surfaces 27A (see FIG. 7B and FIG. 7C) and the second guide surfaces 27B (see FIG. 8B) toward the surface light source mounting portions 25 to be mounted on the surface light source mounting portions 25. At that time, the surface light source 40 in the state of the flat plate is mounted on the surface light source mounting portions 25 in such a manner that the end faces thereof in the Y-axis direction are opposed to the second regulating portions 28A across a slight gap (see FIG. 7B and FIG. 7C) and the end faces thereof in the Z-axis direction are opposed to the third regulating portions 28B across a slight gap (see FIG. 8B). Thus, the surface light source 40 in the state of the flat plate is mounted on the surface light source mounting portions 25 in a state of being positioned relative to the first fixture 20 so as to be symmetrical with respect to the vertical plane including the reference axis AX1 (AX2) (see FIG. 12).

(2) Curving step: bringing the second fixture 30 relatively close to the first fixture 20 to curve the surface light source 40 mounted on the first fixture 20.

Figure 14:
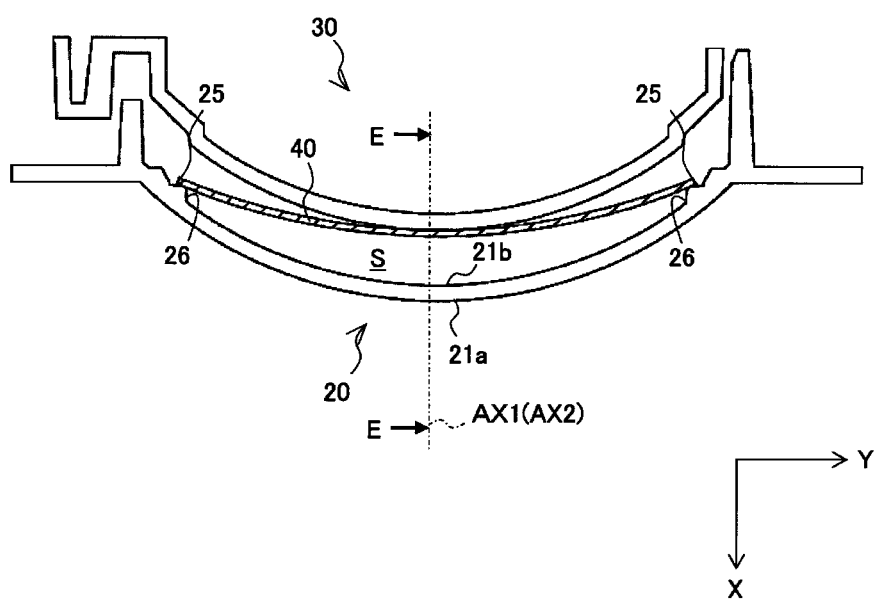
FIG. 14 is a diagram for describing the curving step.
Figure 15A:
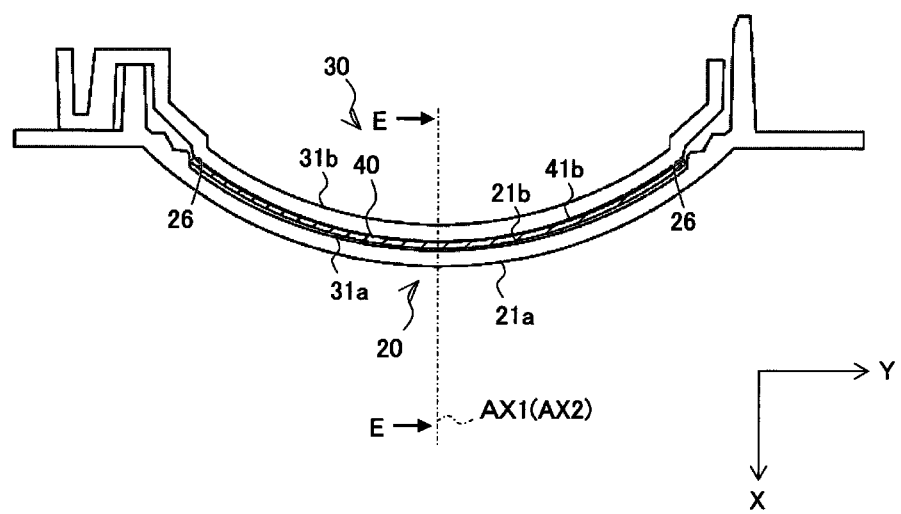
FIG. 15A is a diagram for explaining the curving step.
Figure 15B:
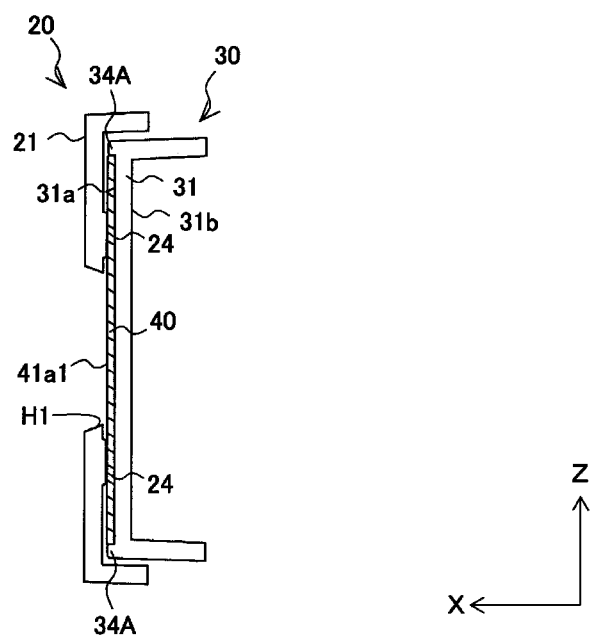
FIG. 15B is a cross-sectional view taken along line E-E of FIG. 15A.
Figure 16:
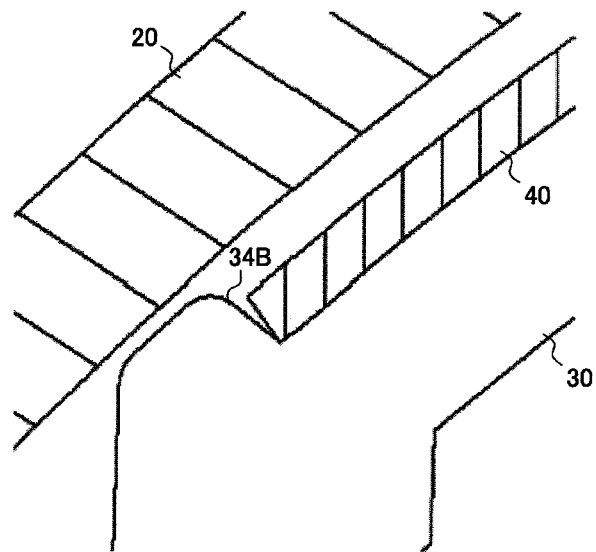
FIG. 16 is a cross-sectional view taken along line F-F of FIG. 2C (perspective cross-sectional view)

FIGS. 13A, 14, and 15A are diagrams illustrating the curving step, and FIG. 13B is a cross-sectional view taken along line D-D of FIG. 13A. FIG. 15B is a cross-sectional view taken along line E-E of FIG. 15A, and FIG. 16 is a cross-sectional view taken along line F-F of FIG. 2C (cross-sectional perspective view).

As illustrated in FIGS. 13A to 15A, the curving step is a step of gradually curving the surface light source 40 mounted on the surface light source mounting portions 25 into the desired shape by bringing the second fixture 30 relatively closer to the first fixture 20 to bring the front surface 31a of the second fixture 30 (second fixture body 31) into contact with the rear surface 41b of the surface light source 40 (surface light source body 41) that has been mounted on the surface light source mounting portions 25, and pushing the surface light source 40 in a certain direction (X-axis direction) toward the first fixture 20 by the second fixture 30.

Specifically, first, the positioning pins 22a (two positions) of the first fixture 20 are inserted (e.g., fitted) into the positioning holes H2 (two positions) of the second fixture 30. Next, the second fixture 30 is relatively brought into close to the first fixture 20 along the positioning pin 22a (see FIGS. 14 and 15), so that the surface light source 40 mounted on the surface light source mounting portions 25 is pressed toward the first fixture 20. In this manner, the surface light source 40 mounted on the surface light source mounting portions 25 is curved.

In the course of the curving, the end faces in the Z-axis direction of the surface light source 40 are opposed to the first positional deviation preventing ribs 34A across a slight gap (see FIG. 13B). That is, the surface light source 40, in the course of the curving, is gradually curved between the first fixture 20 and the second fixture 30 while a state in which the end faces thereof in the Z-axis direction and the first positional deviation preventing ribs 34A are opposed to each other across a slight gap is maintained. Thus, in the course of the curving, the positional deviation of the surface light source 40 (mainly, positional deviation in the Z-axis direction) is suppressed.

Further, in the course of the curving, the end portions of the surface light source 40 in the Y-axis direction are moved in the direction indicated by the arrow A1 in FIG. 7B and the arrow A3 in FIG. 7C. Then, when the end portions of the surface light source 40 in the Y-axis direction are moved more than the length W1 of the surface light source mounting portion 25 in the Y-axis direction, the end portions of the surface light source 40 in the Y-axis direction are further moved in the direction indicated by the arrow A2 in FIG. 7B and the arrow A4 in FIG. 7C, so that the end portions of the surface light source 40 engage with the first regulating portions 26. Thus, the movement of the surface light source 40 curved between the first fixture 20 and the second fixture 30 is restricted in the Y-axis direction.

When the second fixture 30 is further brought into close to the first fixture 20, finally, as illustrated in FIG. 15B, the entire area or substantially the entire area of the rear surface 21b (surface light source holding portion 24) of the first fixture 20 (first fixture body 21) comes into contact (surface contact) with the front surface 41a of the surface light source 40 (surface light source body 41). Further, as illustrated in FIG. 15A, the entire area or substantially the entire area of the front surface 31a of the second fixture 30 (second fixture body 31) comes into contact (surface contact) with the rear surface 41b of the surface light source 40 (surface light source body 41).

Thus, the front surface 41a of the surface light source 40 is curved along the first fixture 20 (surface light source holding portion 24), and the rear surface 41b thereof is curved along the front surface 31a of the second fixture 30 (second fixture body 31). In this state, the surface light source 40 is firmly held between the first fixture 20 (surface light source holding portion 24) and the second fixture 30 (front surface 31a).

(3) Fixing step: fixing the first fixture 20 and the second fixture 30

The fixing step is a step of fixing the first fixture 20 and the second fixture 30 with the thus obtained curved surface light source 40 interposed therebetween.

Specifically, the claw portions 33a (two positions) of the second fixture 30 close to the first fixture 20 as described above are engaged with the engaging portions 23a (two positions) of the first fixture 20, thereby fixing the first fixture 20 and the second fixture 30.

The first fixture 20 and the second fixture 30 fixed in the manner described above can curve the surface light source 40 (light emitting surface 41a1) in a state of protruding toward the light irradiation direction, and in an arc shape symmetrical with respect to the vertical plane including the reference axis AX1 (reference axis AX2).

When the rear surface 21b (surface light source holding portion 24) of the first fixture 20 (first fixture body 21) and the front surface 31a of the second fixture 30 (second fixture body 31) each have a curved surface of an optional curvature, it is possible to curve the surface light source 40 to have the optional curvature as desired.

The first fixture 20 and the second fixture 30 fixed as described above can cause, as illustrated in FIG. 15A, the end faces in the Y-axis direction of the surface light source 40 to be engaged with the first regulating portions 26. Thus, any positional deviation in the Y-axis direction of the surface light source 40 held in a state of being finally curved between the first fixture 20 and the second fixture 30 is suppressed.

Furthermore, the first fixture 20 and the second fixture 30 fixed as described above can cause, as illustrated in FIG. 15B, the end faces in the Z-axis direction of the surface light source 40 to face the first positional deviation preventing ribs 34A across a slight gap. Thus, any positional deviation in the Z-axis direction of the surface light source 40 held in a state of being finally curved between the first fixture 20 and the second fixture 30 is suppressed.

Further, the first fixture 20 and the second fixture 30 fixed as described above can cause, as illustrated in FIG. 16, the end faces in the Y-axis direction of the surface light source 40 to face the second positional deviation preventing ribs 34B across a slight gap. Since the movement in the Y-axis direction of the surface light source 40 which is held in a state of being finally curved between the first fixture 20 and the second fixture 30 is restricted with this configuration, even if there is vibration and impact, the surface light source 40 is prevented from moving through the space between the first regulating portions 26 and the second fixture 30 and from falling off.

As described above, the vehicle lamp unit 10 (light-emitting device) can be manufactured.

The present inventors have actually manufactured the vehicle lamp unit 10 with the foregoing configuration (light-emitting device), and subjected it to vibration and impact tests required for a vehicle parts specification. As a result of evaluation, the present inventors have confirmed that positional deviation and damage of the surface light source 40 was never observed, and there was certain durability.

As described above, according to the present embodiment, it is possible to provide the method of manufacturing the vehicle lamp unit 10 (light-emitting device) and the vehicle lamp unit 10 (light-emitting device) itself which is capable of reducing a work load of a worker when a surface light source 40 is fixed while its desired curved shape is maintained.

This is because the vehicle lamp unit 10 (light-emitting device) can be manufactured by performing (1) the mounting step of mounting the surface light source 40 in the state of the flat plate on the first fixture 20 (on the surface light source mounting portion 25), (2) the curving step of bringing the second fixture 30 relatively close to the first fixture 20 to curve the surface light source 40 mounted on the first fixture 20, and (3) the fixing step of fixing the first fixture 20 and the second fixture 30. It should be noted that each of the foregoing steps may be performed manually by a worker, including a case where a jig is used, or may be performed automatically by a work robot or the like.

Further, according to the present embodiment, it is possible to hold the surface light source 40 in a state of being easily positioned between the first fixture 20 (surface light source holding portion 24) and the second fixture 30 (front surface 31*a* of the second fixture body 31).

This is because, first, the vehicle lamp unit 10 (light-emitting device) includes the configuration for positioning the surface light source 40 to be mounted in a state of a flat plate with respect to the first fixture 20 (mainly, the second regulating portions 28A and the third regulating portions 28B), second, the vehicle lamp unit 10 (light-emitting device) includes the configuration (the first positional deviation preventing ribs 34A) for preventing the positional deviation of the surface light source 40 (mainly, the positional deviation in the Z-axis direction) in the step of curving the surface light source 40, and third, the vehicle lamp unit 10 (light-emitting device) includes the configuration (mainly, the first regulating portions 26) for positioning the surface light source 40 with respect to the first fixture 20 with the surface light source 40 held in a curved state between the first fixture 20 and the second fixture 30.

In addition, according to the present embodiment, it is possible to suppress the surface light source 40 from being curved more than necessary, that is, from being loaded more than necessary in the step of curving.

This is because the foregoing mounting step, curving step, and fixing step are adopted. That is, the foregoing mounting step, curving step, and fixing step can gradually curve the surface light source 40 in the state of the flat plate mounted on the surface light source mounting portion 25 into the desired shape, and thus, the surface light source 40 is not curved more than necessary.

Next, a modified example will be described.

In the above-described embodiment, an example in which the light-emitting device of the presently disclosed subject matter is applied to a vehicle lamp unit (for example, a tail lamp) has been described, but the presently disclosed subject matter is not limited thereto. For example, the light-emitting device of the presently disclosed subject matter may be applied to a positioning lamp other than a tail lamp, a turn signal lamp, a side marker lamp, a vehicle headlight, and the like. Further, the light-emitting device of the presently disclosed subject matter can constitute a rear combination lamp including a tail lamp, a stop lamp, a turn signal lamp or the like in combination. Further, the light-emitting device of the presently disclosed subject matter may be applied to a general-purpose lighting device other than a vehicle lighting device or other lighting devices.

In the forgoing embodiment, an example in which an organic EL panel having flexibility is used as the surface light source 40 has been described, but the presently disclosed subject matter is not limited thereto.

For example, the surface light source 40 may be a flexible light source including at least one selected from the group consisting of an inorganic EL panel having flexibility, a liquid crystal display having flexibility, and a film light source including a plurality of semiconductor light-emitting elements fixed in a state of being two-dimensionally arranged in a flexible film. The surface light source 40 is not limited to a surface light source that spontaneously emits light, such as an organic EL panel, an inorganic EL panel, a liquid crystal display, or a film light source, and may be a reflector that outputs light by reflecting light from an ambient light source, for example, a film-like reflector having flexibility. Examples of the film-like reflector may include a reflex reflector configured to reflect light from an ambient light source (e.g., a headlamp) in a direction opposite to the illumination direction when it is illuminated.

Further, in the foregoing embodiment, the rear surface 21*b* of the first fixture 20 (first fixture body 21) is configured to be recessed in the light irradiation direction while the front surface 31*a* of the second fixture 30 (second fixture body 31) is configured to protrude in the light irradiation direction. Further, they are curved in an arc shape symmetrical with respect to the vertical plane including the reference axis AX1 (reference axis AX2) (see FIG. 7A). However, the presently disclosed subject matter is not limited thereto.

For example, the rear surface 21*b* of the first fixture 20 (the first fixture body 21) and the front surface 31*a* of the second fixture 30 (the second fixture body 31) may have an optional shape. As a result, the surface light source 40, i.e., the light emitting surface 41*a*1, can be curved into an optional shape.

For example, the rear surface 21*b* of the first fixture 20 (first fixture body 21) may be configured to protrude in a direction opposite to the light irradiation direction and the front surface 31*a* of the second fixture 30 (second fixture body 31) may be configured to be recessed in the same opposite direction, and they may be curved in an arc shape symmetrical with respect to the vertical plane including the reference axis AX1 (reference axis AX2).

Figure 17:
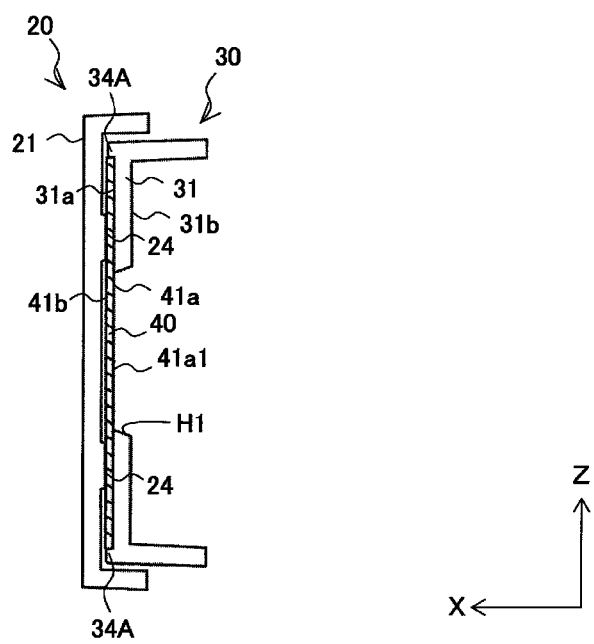
FIG. 17 is a diagram illustrating modified examples of the first fixture 20 (first fixture body 21) and the second fixture 30 (second fixture body 31), respectively.

FIG. 17 shows a modified example of each of the first fixture 20 (first fixture body 21) and the second fixture 30 (second fixture body 31).

As illustrated in FIG. 17, any through hole H1 of the first fixture 20 is not formed while a through hole H1 is formed in the second fixture 30 (second fixture body 31). Then, in the mounting step, the surface light source 40 in a state of a flat plate is mounted on the surface light source mounting portions 25 (positioning ribs R) of the first fixture 20 with the rear surface 41*b* of the surface light source 40 being in a state of facing to the rear surface 21*b* of the first fixture body 21 across a space S, and, the curving step and fixing step are further performed.

Thus, the surface light source 40 (light-emitting surface 41*a*1) can be curved in an arc shape symmetrical with respect to the vertical plane including the reference axis AX1 (reference axis AX2) while being recessed in the light irradiation direction.

Further, for example, the rear surface 21*b* of the first fixture 20 (first fixture body 21) and the front surface 31*a* of the second fixture 30 (second fixture body 31) may each be curved asymmetrically with respect to the vertical plane including the reference axis AX1 (reference axis AX2), for example, in an S-shape.

Thus, the surface light source 40 (light-emitting surface 41a1) can be curved asymmetrically with respect to the vertical plane including the reference axis AX1 (reference axis AX2), for example, in an S-shape.

Furthermore, for example, the rear surface 21b of the first fixture 20 (the first fixture body 21) and the front surface 31a of the second fixture 30 (the second fixture body 31) may be curved three-dimensionally as desired.

As a result, the surface light source 40 (the light-emitting surface 41a1) can be curved three-dimensionally.

In the foregoing embodiment, an example in which the first regulating portion 26 is used has been described, but the presently disclosed subject matter is not limited thereto. The first regulating portion 26 may be omitted. Even if the first regulating portion 26 is omitted, when the first fixture 20 and the second fixture 30 are fixed, as illustrated in FIG. 16, the end faces in the Y-axis direction of the surface light source 40 are opposed to the second positional deviation preventing rib s34B across a slight gap. Therefore, the first fixture 20 and the second fixture 30 can hold the surface light source 40 in a state of being finally curved therebetween with suppressed deviation in the Y-axis direction.

In the foregoing embodiment, an example in which the engaging portion 23a of the first fixture 20 and the claw portion 33a of the second fixture 30 are used as the fixing unit for fixing the first fixture 20 and the second fixture 30 has been described, but the presently disclosed subject matter is not limited thereto.

For example, as the fixing unit for fixing the first fixture 20 and the second fixture 30, a screw, an adhesive, ultrasonic welding, vibration welding, hot plate welding, or other fixing means may be used.

In the forgoing embodiment, an example in which the engaging portion 23a (through hole) is provided in the first fixture 20 and the claw portion 33a is provided in the second fixture 30 has been described, but the presently disclosed subject matter is not limited thereto. For example, conversely, the engaging portion 23a (through hole) may be provided in the second fixture 30, and the claw portion 33a may be provided in the first fixture 20.

All of the numerical values shown in the foregoing embodiments are exemplified, and it is needless to say that an appropriate numerical value different from this can be used.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A light-emitting device comprising:
    a surface light source including a front surface with a light-emitting surface and a rear surface on a side opposite to the front surface and having flexibility;
    a first fixture having a first curved surface protruding in a first direction and that has ends in a second direction orthogonal to the first direction, the first fixture including a first positioning rib and a second positioning rib on a side of the first curved surface, the first positioning rib and the second positioning rib each being an integral part of the first fixture located at or near the respective end of the first curved surface;
    a second fixture having a second curved surface protruding in the first direction, the second fixture including positional deviation prevention ribs configured to face end faces of the surface light source which end faces face in a third direction orthogonal to both the first and second directions, the deviation prevention ribs provided along a curving direction of the second fixture, the positional deviation prevention ribs being an integral part of the second fixture on a convex side of the second curved surface; and
    a fixing unit configured to fix the first fixture and the second fixture, wherein
    the first positioning rib has an inner surface directed to face in a direction orthogonal to the first direction and serving as a regulating portion, and the second positioning rib has an inner surface directed to face the inner surface of the first positioning rib and serving as another regulating portion, and
    the fixing unit fixes the first fixture and the second fixture such that the surface light source is in a curved configuration between the first curved surface of the first fixture and the second curved surface of the second fixture and between the regulating portion of the first positioning rib and the regulating portion of the second positioning rib of the first fixture in the curving direction and is positioned between the positional deviation prevention ribs of the second fixture in the third direction.

2. The light-emitting device according to claim 1, wherein the surface light source, the first fixture, and the second fixture each have a substantially curved rectangular shape, and the regulating portions of the first fixture are provided at positions corresponding to four corners of the surface light source.

3. The light-emitting device according to claim 1, wherein the first direction is a light irradiation direction, the first curved surface is curved in an arc shape recessed in the light irradiation direction and the second curved surface is curved in an arc shape protruding in the light irradiation direction.

4. The light-emitting device according to claim 1, wherein the first curved surface and the second curved surface are each an arc shaped surface.

5. The light-emitting device according to claim 1, wherein the surface light source is a flexible light source including at least one selected from the group consisting of an organic EL panel having flexibility, a liquid crystal display having flexibility, and a film light source including a plurality of semiconductor light-emitting elements fixed in a state of being two-dimensionally arranged in a flexible film.

6. A method of manufacturing a light-emitting device, which includes a surface light source curved in a desired shape, using: the surface light source that includes a front surface with a light-emitting surface and a rear surface on a side opposite to the front surface and has a flexibility; a first fixture configured to protrude in a first direction to be curved and have a first curved surface that is recessed in the first direction and that has ends in a curving direction, the first fixture including a first positioning rib and a second positioning rib and guide surfaces outside of the first and second positioning ribs, respectively, the first positioning rib and the second positioning rib each being an integral part of the first fixture and located at or near a respective end of the first curved surface; and a second fixture configured to protrude in the first direction to be curved and to have a second curved surface protruding in the first direction, the first positioning rib and the second positioning rib each having a surface light source mounting surface on which the surface light source is to be mounted and which faces in a direction opposite to the first direction, the surface light source mounting surface being continued from a corresponding one of the guide surfaces, the first positioning rib having an inner surface facing a direction orthogonal to the first direction and serving as a regulating portion, the second positioning rib having an inner surface directed to face to the inner surface of the first positioning rib and serving as another regulating portion, the method comprising:

- a mounting step of guiding the surface light source in a state of a flat plate along the guide surfaces and then mounting the surface light source on the surface light source mounting surfaces of the first positioning rib and the second positioning rib in such a manner that any of the front surface and the rear surface of the surface light source faces to the first curved surface across a space;
- a curving step of bringing the second fixture relatively close to the first fixture and pushing the surface light source mounted on the surface light source mounting surfaces of the first positioning rib and second positioning rib toward the first fixture by the second fixture to curve the surface light source mounted on the surface light source mounting surfaces, so that the surface light source is held between the regulating portions of the first and second positioning ribs; and
- a fixing step of fixing the first fixture and the second fixture together in a state of holding therebetween the surface light source having been curved in the curving step.

7. The method of manufacturing a light-emitting device according to claim 6, wherein the second fixture includes positional deviation prevention ribs configured to face end faces of the surface light source in the curving step, the end faces of the surface light source facing in a third direction orthogonal to both the first direction and curving direction and provided along the curving direction.

* * * * *